A. R. REESE.
Harvesters.
No. 154,281. Fig. 1. Patented Aug. 18, 1874.
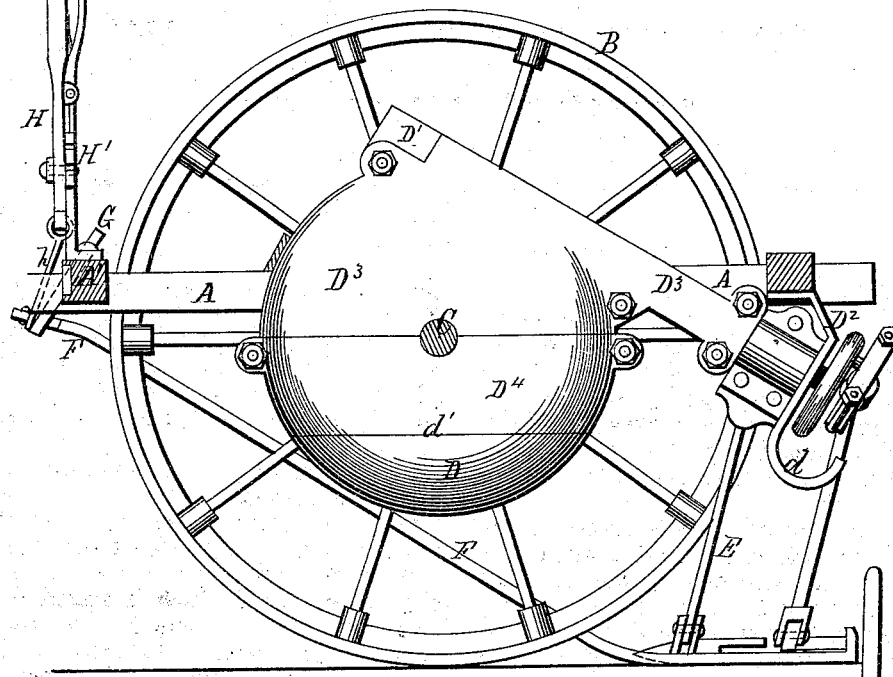
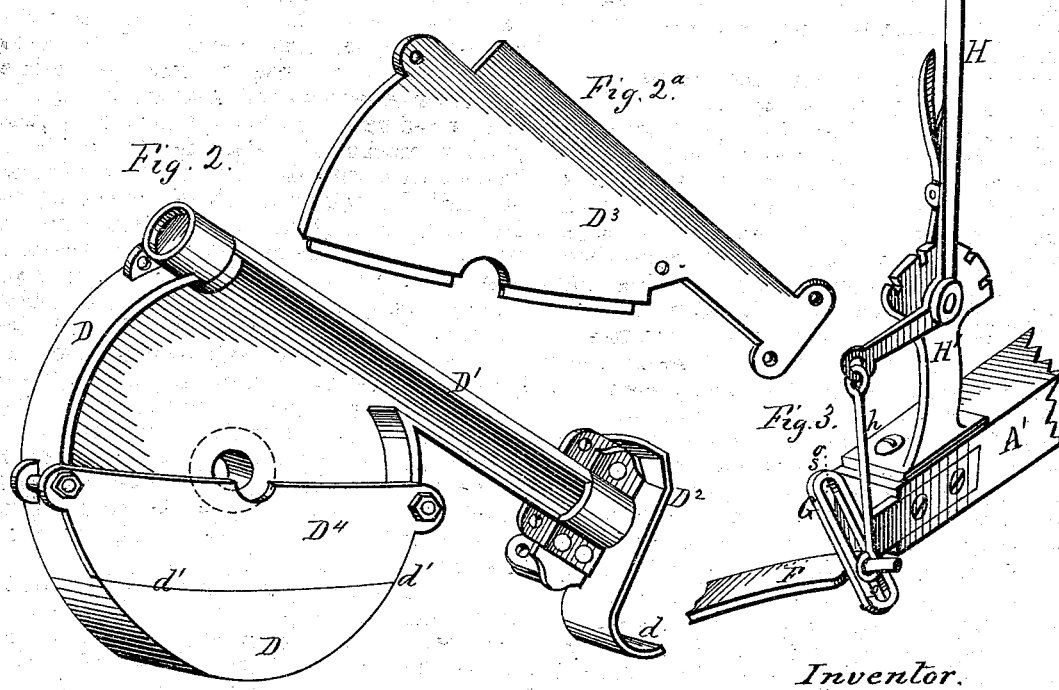
Fig. 2. Fig. 2.ª Fig. 3.
Witnesses.
Alex Mahon
Wm. F. Chaffee
Inventor.
Adam R. Reese
by A. M. Smith, Attorney

UNITED STATES PATENT OFFICE.

ADAM R. REESE, OF PHILLIPSBURG, NEW JERSEY.

IMPROVEMENT IN HARVESTERS.

Specification forming part of Letters Patent No. 154,281, dated August 18, 1874; application filed May 21, 1874.

*To all whom it may concern:*

Be it known that I, ADAM R. REESE, of Phillipsburg, county of Warren, State of New Jersey, have invented certain new and useful Improvements in Harvesting-Machines, of which the following is a full, clear, and exact description, reference being had to the accompanying drawings making part of this specification, in which—

Figure 1 represents a side elevation of the inclosing-frame and inner driving-wheel, &c., the outer driving-wheel being removed. Figs. 2 2$^a$ show the inclosing-frame detached. Fig. 3 is a perspective view of the devices for adjusting the forward end of the drag-bar; and Fig. 4 is a perspective view of the machine, showing the grain-platform and rake and reel attachment applied.

Similar letters of reference denote corresponding parts in all the figures.

The invention relates to a novel construction of the metal gear-frame which incloses the worm-wheel and screw crank-shaft, as hereinafter described, whereby the crank-shaft with its inclosing-sleeve is arranged above the center of rotation of the worm-wheel, and the lower portion of the worm-wheel casing is tightly closed, as hereinafter set forth.

Various attempts have been made to substitute the worm and screw for the ordinary cogged gearing used in harvesting-machines, and some of these have been found to work well in practice when the gearing was new and the parts freshly oiled; but, owing to the fact that the motion was produced by the movement of one part past and in frictional contact with another, or, in other words, by the rubbing of one surface upon another, the moment the lubricating-oil was exhausted the parts quickly became heated by this frictional or rubbing contact, and as a consequence were rapidly worn out and destroyed, necessitating their replacement by new gears at considerable expense before the machine was again fit for use. Among machinists this difference between worm or screw and cogged gearing is generally appreciated, and the difficulty would, in a measure, be obviated by frequent oiling and constant attention; but in the hands of farmers, and in the hurry of the harvest, this attention is ordinarily not given, and the result has been that the machines employing this form of gearing were in many cases speedily rendered useless, and they have failed to give the satisfaction which the simplicity of the gearing and the lightness and ease of its operation, when new, appeared to guarantee.

In the drawing, A A' represent the main frame, rectangular in form; B B', the main driving and carrying wheels, mounted on a common axle, C, and independently connected therewith by backing-ratchets; D, the inclosing casing, within which is placed the worm-wheel keyed to the axle C. The casing D is made, in the main, cylindrical in form, as shown in Figs. 1 and 2, and is provided on its upper forward face with an inclined tubular arm, $D^1$, for the reception of the screw crank-shaft, which has its bearings therein. The outer or rear end of this tubular arm $D^1$ has formed upon or attached to it an angular plate or bracket, $D^2$, adapting the arm $D^1$ to be connected with the rear transverse frame-bar, and forming at $d$ a shield extending underneath and in front of the crank wrist or wheel E. The casing D is, by preference, cast, as above, in one piece, and open upon one side only, sufficiently to permit the introduction of the gearing, and closed when the gearing is in place by a side plate or plates, $D^3$ $D^4$. From the point indicated at $d'$ to the bottom or lowest point of the casing, the casing is cored out in casting, in such manner as to leave no joint or opening for the escape of lubricating-oil placed therein, and to a sufficient depth to insure the partial submerging of the rotating worm-wheel therein when the machine is in operation.

The location of the inclined screw crank-shaft and its inclosing sleeve or tube above the worm-wheel, instead of underneath the same, where it is ordinarily arranged, places its bearings above the lubricating-chamber, in a position where it will not act as a drain to the lubricating-chamber, but at the same time the screw and its bearings will always be kept lubricated by the oil carried up by the teeth and periphery of the worm-wheel, and said teeth, coming, every time they act upon the screw, freshly from the oil in the closed chamber within which they rotate, are kept constantly in condition for acting upon the screw with the least possible amount of friction and wear.

I am aware that gear-casings closed at the bottom have been used in connection with spur and bevel gears, and that such casings were adapted to contain lubricating oil if the user so desired; but it is well understood that such spur and bevel gears, where properly made or with the proper pitch given to the teeth, do not require oiling, and that, with their journals properly lubricated, such gears will work fully as well without oiling as with; but this is not the case with worm and screw-gearing in which the movement is entirely dependent upon the frictional contact of the teeth of the worm-wheel upon the threads of the screw-shaft, as above explained, and in which constant lubrication is required to prevent wear, and to produce the best result of which said worm and screw gear is capable.

Having thus described my invention, what I claim as new, and desire to secure by Letters Patent, is—

The casing D for the screw gear-wheel, having its lower portion made tight, and the tubular casing $D^1$ for the crank-shaft and worm-gear, constructed together as specified, and arranged upon the supporting-frame so that the part $D^1$, inclosing the screw, shall be above the center of motion of the worm gear-wheel, substantially as and for the purpose described.

In testimony whereof I have hereunto set my hand this 18th day of May, A. D. 1874.

ADAM R. REESE.

Witnesses:
W. R. BEERS,
LEWIS C. REESE.